(12) United States Patent
Boyle et al.

(10) Patent No.: US 11,648,831 B2
(45) Date of Patent: May 16, 2023

(54) VEHICLE CONVERTIBLE TOP SYSTEMS

(71) Applicants: Michael S Boyle, Berkley, MI (US); Mikil L Sockow, Troy, MI (US); David C Fischer, Troy, MI (US); Richard T Stuedemann, Ortonville, MI (US)

(72) Inventors: Michael S Boyle, Berkley, MI (US); Mikil L Sockow, Troy, MI (US); David C Fischer, Troy, MI (US); Richard T Stuedemann, Ortonville, MI (US)

(73) Assignee: FCA US LLC, Auburn Hills, MI (US)

( * ) Notice: Subject to any disclaimer, the term of this patent is extended or adjusted under 35 U.S.C. 154(b) by 131 days.

(21) Appl. No.: 17/124,788

(22) Filed: Dec. 17, 2020

(65) Prior Publication Data
US 2021/0178874 A1 Jun. 17, 2021

Related U.S. Application Data

(60) Provisional application No. 62/949,040, filed on Dec. 17, 2019.

(51) Int. Cl.
*B60J 7/11* (2006.01)
*B60J 7/10* (2006.01)
(Continued)

(52) U.S. Cl.
CPC ............... *B60J 7/11* (2013.01); *B60J 7/141* (2013.01); *B60J 1/085* (2013.01); *B60J 1/183* (2013.01);
(Continued)

(58) Field of Classification Search
CPC ... B60J 1/1838; B60J 1/085; B60J 7/11; B60J 7/106; B60J 7/1607; B60J 7/1628; B60J 7/00; B60J 7/10; B62D 33/04
(Continued)

(56) References Cited

U.S. PATENT DOCUMENTS

| 5,015,028 A | 5/1991 | Bonnett |
| 6,386,617 B1 * | 5/2002 | Kusuma ................... B60J 1/085 |
| | | 296/147 |

(Continued)

FOREIGN PATENT DOCUMENTS

| DE | 202019102090 U1 * | 6/2019 | ............... B60J 7/11 |
| EP | 1184218 B1 | 1/2007 | |

OTHER PUBLICATIONS

Machine translation of DE-202019102090-U1.*
(Continued)

*Primary Examiner* — D Glenn Dayoan
*Assistant Examiner* — Kevin P Weldon
(74) *Attorney, Agent, or Firm* — Ralph E. Smith (57) ABSTRACT

A modular, multi-component hard top assembly for a vehicle having an interior with front passenger seating, rear passenger seating, and a rear cargo area is provided. In one example implementation, the hard top assembly includes a base frame configured to removably couple to a body of the vehicle, and a plurality of removable roof panels selectively coupleable to the base frame to create a substantially contiguous roof over the vehicle interior. Each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment.

15 Claims, 5 Drawing Sheets

(51) Int. Cl.
  *B60J 7/00* (2006.01)
  *B62D 33/04* (2006.01)
  *B60J 7/14* (2006.01)
  *B60J 1/08* (2006.01)
  *B60J 1/18* (2006.01)

(52) U.S. Cl.
  CPC ............ *B60J 1/1823* (2013.01); *B60J 7/0076* (2013.01); *B60J 7/106* (2013.01); *B62D 33/04* (2013.01)

(58) Field of Classification Search
  USPC ............... 296/146.16, 147, 148, 107.07, 218
  See application file for complete search history.

(56) References Cited

U.S. PATENT DOCUMENTS

| | | | |
|---|---|---|---|
| 7,240,960 | B2 | 7/2007 | Fallis, III et al. |
| 8,408,623 | B1* | 4/2013 | McAuliff ................. B60J 1/085 296/210 |
| 8,764,095 | B2 | 7/2014 | Ritzinger et al. |
| 8,991,896 | B1* | 3/2015 | Whitehead ............... B60J 7/196 296/121 |
| 10,035,408 | B2 | 7/2018 | Crismon et al. |
| 2008/0231072 | A1 | 9/2008 | Franco et al. |
| 2015/0283951 | A1 | 10/2015 | Singleton |
| 2018/0079288 | A1 | 3/2018 | Johnson |
| 2018/0257467 | A1* | 9/2018 | Rodriguez ............... B60J 1/085 |
| 2019/0241053 | A1* | 8/2019 | Desai ......................... B60J 1/14 |
| 2019/0308673 | A1* | 10/2019 | Mar ...................... B62D 25/06 |
| 2019/0329638 | A1* | 10/2019 | Willard ..................... B60J 7/11 |
| 2021/0178864 | A1* | 6/2021 | Boyle .................... B60J 1/1884 |
| 2021/0178872 | A1* | 6/2021 | Boyle .................... B60J 1/1838 |
| 2021/0178873 | A1* | 6/2021 | Boyle .................... B60J 1/1838 |
| 2022/0089067 | A1* | 3/2022 | Salter ....................... B60N 3/10 |
| 2022/0111713 | A1* | 4/2022 | Krapfl ..................... B60J 7/106 |

OTHER PUBLICATIONS

International Search Report and Written Opinion dated Mar. 23, 2021 for International Application No. PCT/US2020/065556, International Filing Date Dec. 17, 2020.

* cited by examiner

VEHICLE CONVERTIBLE TOP SYSTEMS

CROSS REFERENCE TO RELATED APPLICATION

This application claims the benefit of U.S. Prov. App. No. 62/949,040, filed Dec. 17, 2019, the contents of which are incorporated herein by reference thereto.

FIELD

The present application relates generally to vehicle convertible top systems and, more particularly, to modular multi-component hard top systems for a vehicle.

BACKGROUND

It is known in the motor vehicle art to provide a convertible top, which may be folded back or removed from the vehicle. In one example, the convertible top is constructed of a rigid/hard material (e.g., referred to as a hard top) or a flexible fabric (e.g., referred to as a soft top) and is folded back to a storage position or otherwise removed from an installation position. Such convertible tops provide the user with the benefit of open air driving while affording available protection in the event of adverse weather conditions. However, some hard tops must be removed all as one component, which can be very heavy, thereby requiring multiple people or special equipment to remove. Other hard tops can only be removed over the front row of seats. Therefore, while such convertible tops work well for their intended purpose, it is desirable to provide improvements in the relevant art.

SUMMARY

In accordance with one example aspect of the invention, a modular, multi-component hard top assembly for a vehicle having an interior with front passenger seating, rear passenger seating, and a rear cargo area is provided. In one example implementation, the hard top assembly includes a base frame configured to removably couple to a body of the vehicle, and a plurality of removable roof panels selectively coupleable to the base frame to create a substantially contiguous roof over the vehicle interior. Each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment.

In addition to the foregoing, the described hard top assembly may include one or more of the following features: a pair of removable quarter windows selectively coupleable to the base frame to at least partially enclose the rear cargo area, wherein each removable quarter window is separately removable from the base frame to provide an open air configuration at the rear cargo area while enabling the user to detach, remove, and transport the removable quarter windows of the hard top assembly without assistance or specialized equipment; wherein the base frame includes a rear window frame member; and a removable flipper glass assembly rotatably coupled to the base frame and movable between a closed position and an open position, wherein the flipper glass assembly is selectively detachable from the rear window frame member to provide an open air configuration at the rear cargo area while enabling the user to detach, remove, and transport the removable flipper glass assembly of the hard top assembly without assistance or specialized equipment.

In addition to the foregoing, the described hard top assembly may include one or more of the following features: wherein the plurality of removable roof panels includes a forward removable roof panel configured to removably couple to the base frame in a location above and across the front passenger seating, an intermediate removable roof panel configured to removably couple to the base frame in a location above and across the rear passenger seating, and a rearward removable roof panel configured to removably couple to the base frame in a location above and across the rear cargo area; and wherein the base frame further includes a fixed rear roof configured to be disposed in a location above and across the rear passenger seating and the rear cargo area when the base frame is coupled to the vehicle body.

In addition to the foregoing, the described hard top assembly may include one or more of the following features: wherein the plurality of removable roof panels includes a driver overhead removable roof panel configured to removably couple to the base frame in a location above a driver's side of the front passenger seating, and a front passenger overhead removable roof panel configured to removably couple to the base frame in a location above a front passenger side of the front passenger seating; and wherein the base frame further comprises an intermediate support member and a fixed rear roof at least partially defining a rear passenger overhead opening, the fixed rear roof configured to be disposed in a location above and across the rear cargo area when the base frame is coupled to the vehicle body.

In addition to the foregoing, the described hard top assembly may include one or more of the following features: wherein the plurality of removable roof panels includes an intermediate left removable roof panel configured to removably couple to the base frame in a location within the rear passenger overhead opening above a left side of the rear passenger seating, and an intermediate right removable roof panel configured to removably couple to the base frame in a location within the rear passenger overhead opening above a right side of the rear passenger seating; and wherein the base frame further comprises a pair of spaced apart outboard frame members, wherein the plurality of removable roof panels are configured to be disposed inboard of the spaced apart outboard frame members when the plurality of removable roof panels are coupled to the base frame.

In accordance with another example aspect of the invention, a vehicle is provided. In one example implementation, the vehicle includes a vehicle body, a vehicle interior with front passenger seating, rear passenger seating, and a rear cargo area; and a modular, multi-component hard top assembly. The hard top assembly is configured to selectively and removably couple to the vehicle body to provide an enclosed configuration at least partially enclosing the vehicle interior, and subsequently detachable from the vehicle body to provide an open air configuration for the vehicle interior. The hard top assembly includes a base frame configured to removably couple to the vehicle body, and a plurality of removable roof panels selectively coupleable to the base frame to create a substantially contiguous roof over the vehicle interior. Each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment.

In addition to the foregoing, the described vehicle may include one or more of the following features: wherein the plurality of removable roof panels includes a forward removable roof panel configured to removably couple to the base frame in a location above and across the front passenger seating; wherein the forward removable roof panel includes a driver overhead removable roof panel configured to removably couple to the base frame in a location above a driver's side of the front passenger seating, and a front passenger overhead removable roof panel configured to removably couple to the base frame in a location above a front passenger side of the front passenger seating; and wherein the plurality of removable roof panels further includes an intermediate removable roof panel configured to removably couple to the base frame in a location above and across the rear passenger seating.

In addition to the foregoing, the described vehicle may include one or more of the following features: wherein the intermediate removable roof panel includes an intermediate left removable roof panel configured to removably couple to the base frame in a location above a left side of the rear passenger seating, and an intermediate right removable roof panel configured to removably couple to the base frame in a location above a right side of the rear passenger seating; wherein the plurality of removable roof panels further includes a rearward removable roof panel configured to removably couple to the base frame in a location above and across the rear cargo area; and wherein the hard top assembly further comprises a pair of removable quarter windows selectively coupleable to the base frame to at least partially enclose the rear cargo area, wherein each removable quarter window is separately removable from the base frame to provide an open air configuration at the rear cargo area while enabling the user to detach, remove, and transport the removable quarter windows of the hard top assembly without assistance or specialized equipment.

In addition to the foregoing, the described vehicle may include one or more of the following features: wherein the base frame includes a rear window frame member; and wherein the hard top assembly further comprises a removable flipper glass assembly rotatably coupled to the base frame and movable between a closed position and an open position, wherein the flipper glass assembly is selectively detachable from the rear window frame member to provide an open air configuration at the rear cargo area while enabling the user to detach, remove, and transport the removable flipper glass assembly of the hard top assembly without assistance or specialized equipment.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for vehicle convertible top systems. In the example embodiments, the convertible top systems include a modular, multi-piece hard top assembly that enables removal of one or more rigid hard top pieces above passengers to create a more open air experience, particularly for rear seat passengers. Such a design advantageously breaks the hard top assembly into more manageable pieces, thereby making the removal of the hard top much easier.

Figure 1A:
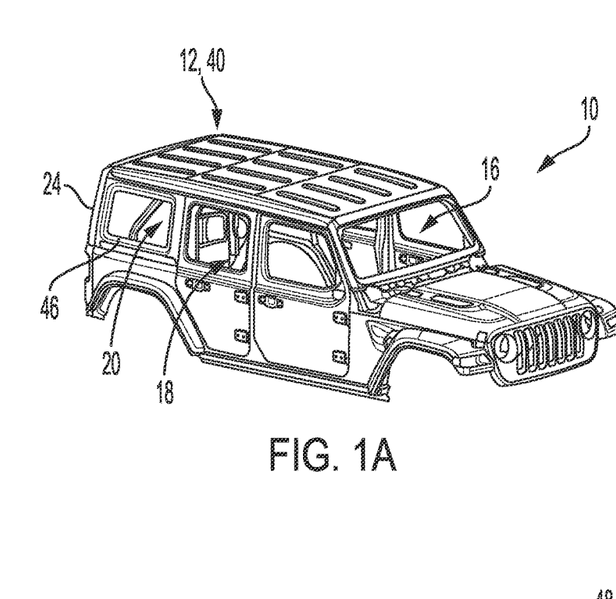
FIG. 1A is a perspective view of a vehicle with an example modular multi-component hard top assembly in accordance with the principles of the present disclosure.
Figure 1B:
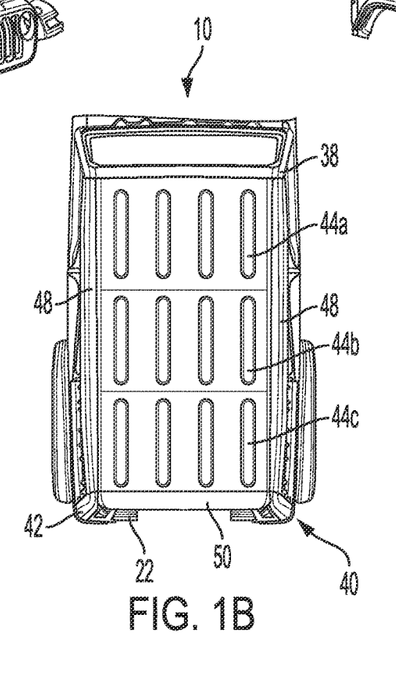
FIG. 1B is a top view of the hard top assembly shown in FIG. 1A, in accordance with the principles of the present disclosure.
Figure 1C:
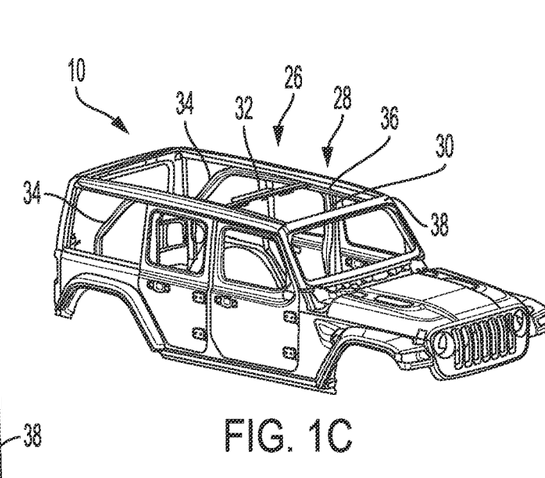
FIG. 1C is perspective view of the vehicle of FIG. 1A with components of the hard top assembly removed, in accordance with the principles of the present disclosure.

With initial reference to FIGS. 1A-1C, a vehicle 10 having a convertible top system 12 in accordance with the principles of the present disclosure is illustrated. In the example embodiment, the vehicle 10 generally includes a vehicle body 14, an interior with front passenger seating 16 and rear passenger seating 18, and a rear cargo area 20 at least partially enclosed by a tailgate 22 (FIG. 1B) and a rear hatch glass or flipper glass assembly 24. The tailgate 22 is rotatably coupled to the vehicle body 14, and the flipper glass assembly is removably and rotatably coupled to the convertible top system 12. A roll bar assembly 26 extends upwardly from the vehicle body 14 and includes a generally U-shaped main roll bar 28 formed by a pair of laterally spaced apart vertical members 30 interconnected by a transverse member 32. A pair of rear roll or sport bars 34 are coupled to the main roll bar 28 and extend rearward therefrom and downwardly to the vehicle body 14. A pair of laterally spaced apart side bars 36 are coupled to the main roll bar 28 and extend forwardly to a vehicle windshield assembly 38.

With continued reference to FIG. 1A, in the example embodiment, the convertible top system 12 is a multi-component hard top assembly 40 that generally includes a base structure or frame 42 configured to removably receive a plurality of removable roof panels 44a-c, removable quarter windows 46, and the removable flipper glass assembly 24. As shown for example in FIG. 1C, the base frame 42 includes a pair of outboard frame members 48 and a rear window frame member 50, which are removably coupled to the roll bar assembly 26.

In the illustrated example, the removable roof panels 44 are removably coupled to and between the outboard frame members 48, the removable quarter windows 46 are removably coupled to and between the outboard frame members 48 and the vehicle body 14, and the removable flipper glass assembly 24 is removably coupled to the rear window frame member 50. The forward roof panel 44a may additionally couple to the windshield assembly 38, the rearward roof panel 44c may additionally couple to the rear window frame member 50, and the intermediate roof panel 44b may additionally couple to either or both of panels 44a, 44c. When assembled, the hard top assembly 40 provides a sealed contiguous or substantially contiguous vehicle roof over the vehicle interior cabin.

Advantageously, in the example embodiment, forward removable roof panel 44a is selectively uncoupleable from the hard top assembly 40 to provide an open air configuration over the front passenger seating 16, intermediate removable roof panel 44b is selectively uncoupleable from the hard top assembly 40 to provide an open air configuration over the rear passenger seating 18, and rearward removable roof panel 44c is selectively uncoupleable from the hard top assembly 40 to provide an open air configuration over the rear cargo area 20. To provide additional open air configuration to the rear cargo area 20, the removable quarter windows 46 and the removable flipper glass assembly 24 are selectively uncoupleable from the hard top assembly 40, as shown in FIG. 1C.

FIGS. 1A and 1B illustrate the vehicle 10 with the hard top assembly 40 assembled onto the vehicle body 14. If desired, a user can remove one or more portions of the hard top assembly 40 from the vehicle body 14. In this way, the hard top assembly 40 enables the ability to create an open air experience by removing the roof panels 44, quarter windows 46, and flipper glass assembly 24, as shown in FIG. 1C, or by removing the entire hard top assembly 40 altogether (not shown). Unlike a single piece assembly, the hard top assembly 40 includes multiple separately removable panels/windows/components that enable a single person to easily convert the vehicle 10 from an enclosed configuration (hard top assembly attached, FIG. 1A) to an open-air configuration (hard top assembly, or portions thereof, removed) for example, as shown in FIG. 1C.

Figure 2A:
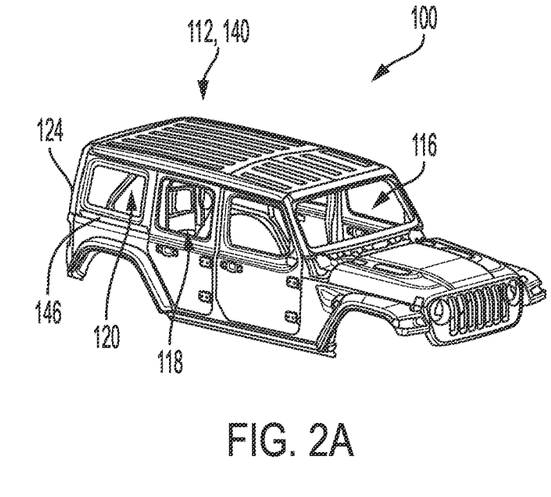
FIG. 2A is a perspective view of a vehicle with another example modular multi-component hard top assembly in accordance with the principles of the present disclosure.
Figure 2B:
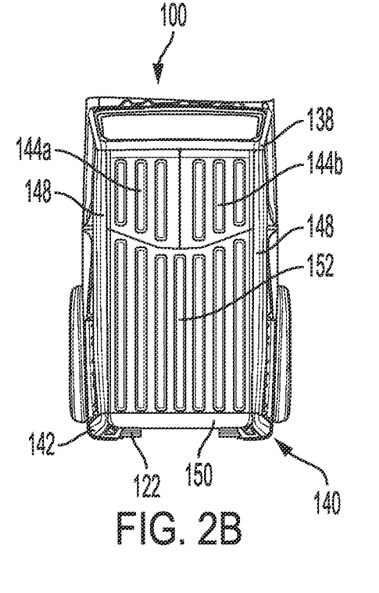
FIG. 2B is a top view of the hard top assembly shown in FIG. 2A, in accordance with the principles of the present disclosure.
Figure 2C:
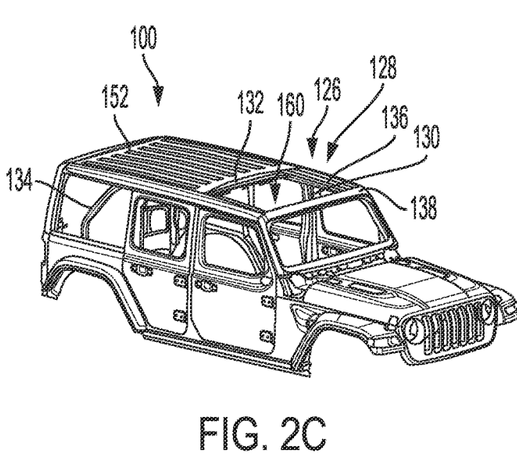
FIG. 2C is perspective view of the vehicle of FIG. 2A with components of the hard top assembly removed, in accordance with the principles of the present disclosure.

With reference now to FIGS. 2A-2C, a vehicle 100 having a convertible top system 112 in accordance with the principles of the present disclosure is illustrated. In the example embodiment, the vehicle 100 generally includes a vehicle body 114, an interior with front passenger seating 116 and rear passenger seating 118, and a rear cargo area 120 at least partially enclosed by a tailgate 122 (FIG. 2B) and a rear hatch glass or flipper glass assembly 124. The tailgate 122 is rotatably coupled to the vehicle body 114, and the flipper glass assembly 124 is removably and rotatably coupled to the convertible top system 112. A roll bar assembly 126 extends upwardly from the vehicle body 114 and includes a generally U-shaped main roll bar 128 formed by a pair of laterally spaced apart vertical members 130 interconnected by a transverse member 132. A pair of rear roll or sport bars 134 are coupled to the main roll bar 128 and extend rearward therefrom and downwardly to the vehicle body 114. A pair of laterally spaced apart side bars 136 are coupled to the main roll bar 128 and extend forwardly to a vehicle windshield assembly 138.

With continued reference to FIG. 2A, in the example embodiment, the convertible top system 112 is a multi-component hard top assembly 140 that generally includes a base structure or frame 142 configured to removably receive a plurality of removable roof panels 144a-b, removable quarter windows 146, and the removable flipper glass assembly 124. As shown for example in FIG. 2C, the base frame 142 is removably coupleable to the roll bar assembly 126 and includes a pair of outboard frame members 148, a rear window frame member 150, and a rear passenger and cargo area roof 152. In some examples, the rear window frame member 150 and/or the rear roof 152 are permanently fixed between and integrated with the outboard frame members 148.

As shown in FIG. 2C, the outboard frame members 148, rear roof 152, and windshield assembly 138 at least partially define a front passenger overhead opening 160. The removable roof panels 144 are each removably coupled to at least one of one outboard frame members 148, roof 152, and windshield assembly 138 to selectively enclose the front passenger overhead opening 160. The removable quarter windows 146 are removably coupled to and between the outboard frame members 148 and the vehicle body 114, and the removable flipper glass assembly 124 is removably coupled to the rear window frame member 150. When assembled, the hard top assembly 140 provides a sealed contiguous or substantially contiguous vehicle roof over the vehicle interior cabin.

Advantageously, in the example embodiment, driver overhead removable roof panel 144a is selectively uncoupleable from the hard top assembly 140 to provide an open air configuration over the driver's side of front passenger seating 116, and front passenger overhead removable roof panel 144b is selectively uncoupleable from the hard top assembly 140 to provide an open air configuration over the front passenger's side of front passenger seating 116. To provide open air configuration to the rear cargo area 120, the removable quarter windows 146 and the removable flipper glass assembly 124 are selectively uncoupleable from the hard top assembly 140, as shown in FIG. 2C.

FIGS. 2A and 2B illustrate the vehicle 100 with the hard top assembly 140 assembled onto the vehicle body 114. If desired, a user can remove one or more portions of the hard top assembly 140 from the vehicle body 114. In this way, the hard top assembly 140 enables the ability to create an open air experience by removing the roof panels 144, quarter windows 146, and flipper glass assembly 124, as shown in FIG. 2C, or by removing the entire hard top assembly 140 altogether (not shown). Unlike a single piece assembly, the hard top assembly 140 includes multiple separately removable panels/windows/components that enable a single person to easily convert the vehicle 100 from an enclosed configuration (hard top assembly attached, FIG. 2A) to an open-air configuration (hard top assembly, or portions thereof, removed) for example, as shown in FIG. 2C.

Figure 3A:
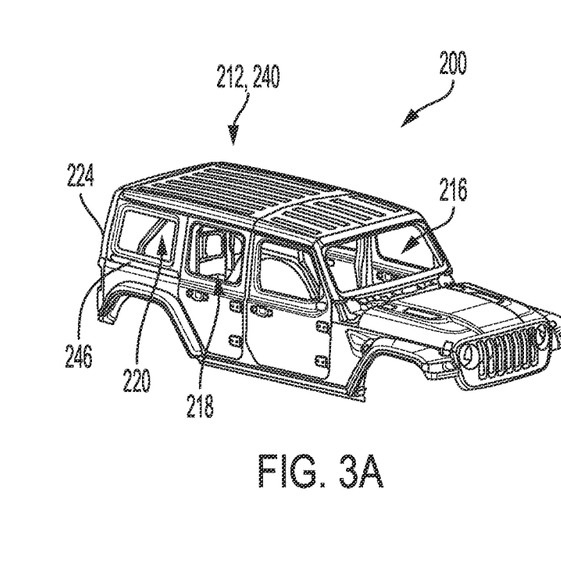
FIG. 3A is a perspective view of a vehicle with yet another example modular multi-component hard top assembly in accordance with the principles of the present disclosure.
Figure 3B:
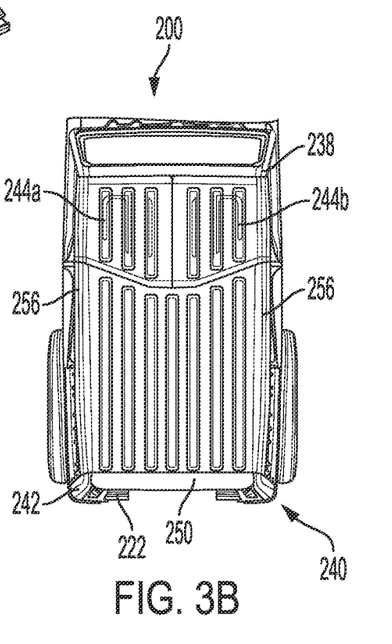
FIG. 3B is a top view of the hard top assembly shown in FIG. 3A, in accordance with the principles of the present disclosure.
Figure 3C:
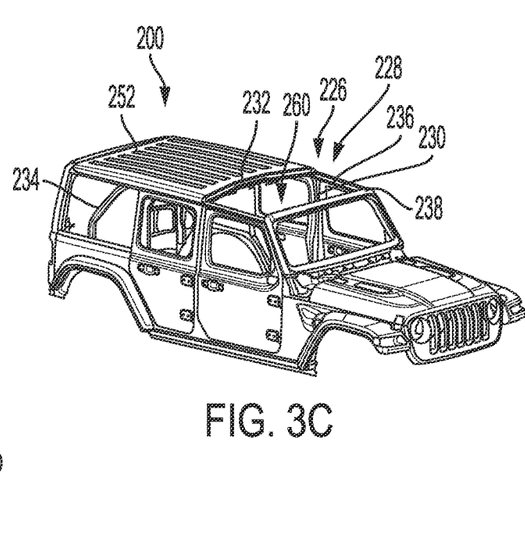
FIG. 3C is perspective view of the vehicle of FIG. 3A with components of the hard top assembly removed, in accordance with the principles of the present disclosure.

With reference now to FIGS. 3A-3C, a vehicle 200 having a convertible top system 212 in accordance with the principles of the present disclosure is illustrated. Convertible top system 212 is similar to convertible top system 112 except it does not include outboard frame members 148 extending to windshield assembly 138. In the example embodiment, the vehicle 200 generally includes a vehicle body 214, an interior with front passenger seating 216 and rear passenger seating 218, and a rear cargo area 220 at least partially enclosed by a tailgate 222 (FIG. 3B) and a rear hatch glass or flipper glass assembly 224. The tailgate 222 is rotatably coupled to the vehicle body 214, and the flipper glass assembly 224 is removably and rotatably coupled to the convertible top system 212. A roll bar assembly 226 extends upwardly from the vehicle body 214 and includes a generally U-shaped main roll bar 228 formed by a pair of laterally spaced apart vertical members 230 interconnected by a transverse member 232. A pair of rear roll or sport bars 234 are coupled to the main roll bar 228 and extend rearward therefrom and downwardly to the vehicle body 214. A pair of laterally spaced apart side bars 236 are coupled to the main roll bar 228 and extend forwardly to a vehicle windshield assembly 238.

With continued reference to FIG. 3A, in the example embodiment, the convertible top system 212 is a multi-component hard top assembly 240 that generally includes a base structure or frame 242 configured to removably receive a plurality of removable roof panels 244a-b, removable quarter windows 246, and the removable flipper glass assembly 224. As shown for example in FIG. 3C, the base frame 242 is removably coupleable to the roll bar assembly 226 and includes a rear window frame member 250, a rear roof 252, and a pair of partially extending rear outboard frame members 256. In some examples, the rear window frame member 250 and/or the rear roof 152 are permanently fixed between and integrated with the outboard frame members 256.

As shown in FIG. 3C, the side bars 236, roof 252, and windshield assembly 238 at least partially define a front passenger overhead opening 260. The removable roof panels 244 are each removably coupled to at least one of the side bar 236, roof 252, and windshield assembly 238 to selectively enclose the front passenger overhead opening 260. The removable quarter windows 246 are removably coupled to and between the roof 252 and the vehicle body 214, and the removable flipper glass assembly 224 is removably coupled to the rear window frame member 250. When assembled, the hard top assembly 240 provides a sealed contiguous or substantially contiguous vehicle roof over the vehicle interior cabin.

Advantageously, in the example embodiment, driver overhead removable roof panel 244a is selectively uncoupleable from the hard top assembly 240 to provide an open air configuration over the driver's side of front passenger seating 216, and front passenger overhead removable roof panel 244b is selectively uncoupleable from the hard top assembly 240 to provide an open air configuration over the front passenger's side of front passenger seating 216. To provide open air configuration to the rear cargo area 220, the removable quarter windows 246 and the removable flipper glass assembly 224 are selectively uncoupleable from the hard top assembly 240, as shown in FIG. 3C.

FIGS. 3A and 3B illustrate the vehicle 200 with the hard top assembly 240 assembled onto the vehicle body 214. If desired, a user can remove one or more portions of the hard top assembly 240 from the vehicle body 214. In this way, the hard top assembly 240 enables the ability to create an open air experience by removing the roof panels 244, quarter windows 246, and flipper glass assembly 224, as shown in FIG. 3C, or by removing the entire hard top assembly 240 altogether (not shown). Unlike a single piece assembly, the hard top assembly 240 includes multiple separately removable panels/windows/components that enable a single person to easily convert the vehicle 200 from an enclosed configuration (hard top assembly attached, FIG. 3A) to an open-air configuration (hard top assembly, or portions thereof, removed) for example, as shown in FIG. 3C.

With reference now to FIGS. 4A-4D, a vehicle 300 having a convertible top system 312 in accordance with the principles of the present disclosure is illustrated. In the example embodiment, the vehicle 300 generally includes a vehicle body 314, an interior with front passenger seating 316 and rear passenger seating 318, and a rear cargo area 320 at least partially enclosed by a tailgate 322 (FIG. 4B) and a rear hatch glass or flipper glass assembly 324. The tailgate 322 is rotatably coupled to the vehicle body 314, and the flipper glass assembly 324 is removably and rotatably coupled to the convertible top system 312. A roll bar assembly 326 extends upwardly from the vehicle body 314 and includes a generally U-shaped main roll bar 328 formed by a pair of laterally spaced apart vertical members 330 interconnected by a transverse member 332. A pair of rear roll or sport bars 334 are coupled to the main roll bar 328 and extend rearward therefrom and downwardly to the vehicle body 314. A pair of laterally spaced apart side bars 336 are coupled to the main roll bar 328 and extend forwardly to a vehicle windshield assembly 338.

Figure 4A:
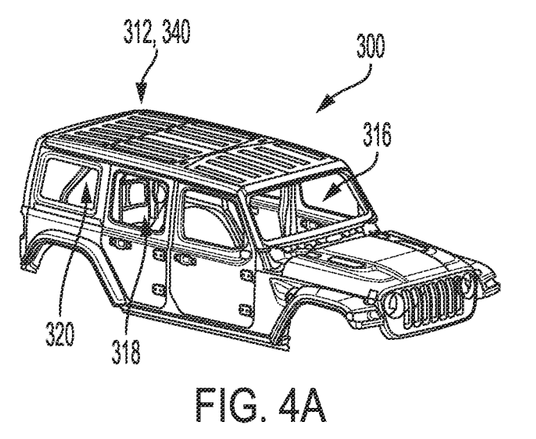
FIG. 4A is a perspective view of a vehicle with another example modular multi-component hard top assembly in accordance with the principles of the present disclosure.
Figure 4B:
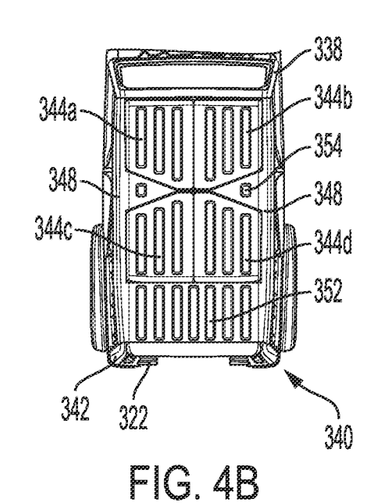
FIG. 4B is a top view of the hard top assembly shown in FIG. 4A, in accordance with the principles of the present disclosure.
Figure 4C:
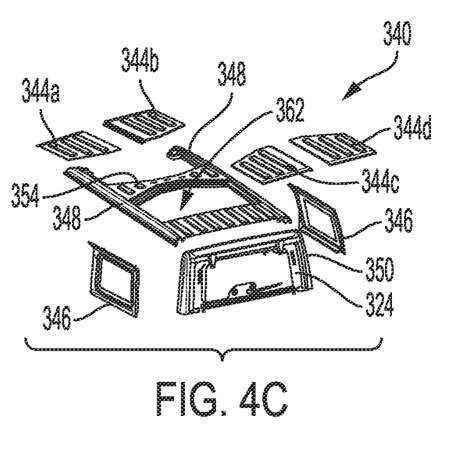
FIG. 4C is an exploded view of the hard top assembly shown in FIG. 4A, in accordance with the principles of the present disclosure.

With continued reference to FIGS. 4A-4C, in the example embodiment, the convertible top system 312 is a multi-component hard top assembly 340 that generally includes a base structure or frame 342 configured to removably receive a plurality of removable roof panels 344a-d, removable quarter windows 346, and the removable flipper glass assembly 324. As shown for example in FIGS. 4C and 4D, the base frame 342 is removably coupleable to the roll bar assembly 326 and includes a pair of outboard frame members 348, a rear window frame member 350, a rear cargo area roof 352, and a cross-car intermediate support member 354. In some examples, the rear window frame member 350 and/or the rear roof 352, and/or the intermediate support member 354 are permanently fixed between and integrated with the outboard frame members 348.

Figure 4D:
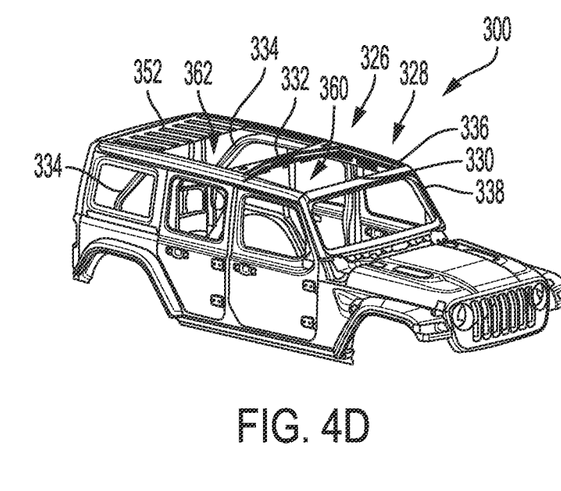
FIG. 4D is perspective view of the vehicle of FIG. 4A with components of the hard top assembly removed, in accordance with the principles of the present disclosure.

As shown in FIG. 4D, the outboard frame members 348, the intermediate support member 354, and the windshield assembly 338 at least partially define a front passenger overhead opening 360. The front removable roof panels 344a-b are each removably coupled to at least one of the outboard frame member 348, intermediate support member 354, and windshield assembly 338 to selectively enclose the front passenger overhead opening 360.

In the example embodiment, the outboard frame members 348, the intermediate support member 354, and the rear roof 352 at least partially define a rear passenger overhead opening 362. The rear/intermediate removable roof panels 344c-d are each removably coupled to at least one of the outboard frame member 348, intermediate support member 354, and rear cargo area roof 352 to selectively enclose the rear passenger overhead opening 362. The removable quarter windows 346 are removably coupled to and between the outboard frame members 348/roof 352 and the vehicle body 314, and the removable flipper glass assembly 324 is removably coupled to the rear window frame member 350. When assembled, the hard top assembly 340 provides a sealed contiguous or substantially contiguous vehicle roof over the vehicle interior cabin.

Advantageously, in the example embodiment, front removable roof panel 344a is selectively uncoupleable from the hard top assembly 340 to provide an open air configuration over the driver's side of front passenger seating 316, and front removable roof panel 344b is selectively uncoupleable from the hard top assembly 340 to provide an open air configuration over the front passenger's side of front passenger seating 316. Similarly, intermediate removable roof panel 344c is selectively uncoupleable from the hard top assembly 340 to provide an open air configuration over the driver's side rear passenger seating 318, and intermediate removable roof panel 344d is selectively uncoupleable from the hard top assembly 340 to provide an open air configuration over the right side of rear passenger seating 318. To provide open air configuration to the rear cargo area 320, the removable quarter windows 346 and the removable flipper glass assembly 324 are selectively uncoupleable from the hard top assembly 340, as shown in FIG. 4D.

FIGS. 4A and 4B illustrate the vehicle 300 with the hard top assembly 340 assembled onto the vehicle body 314. If desired, a user can remove one or more portions of the hard top assembly 340 from the vehicle body 314. In this way, the hard top assembly 340 enables the ability to create an open air experience by removing the roof panels 344, quarter windows 346, and flipper glass assembly 324, as shown in FIG. 4D, or by removing the entire hard top assembly 340 altogether (not shown). Unlike a single piece assembly, the hard top assembly 340 includes multiple separately removable panels/windows/components that enable a single person to easily convert the vehicle 300 from an enclosed configuration (hard top assembly attached, FIG. 4A) to an open-air configuration (hard top assembly, or portions thereof, removed) for example, as shown in FIG. 4D.

With reference now to FIGS. 5A-5D, a vehicle 400 having a convertible top system 412 in accordance with the principles of the present disclosure is illustrated. Convertible top system 412 is similar to convertible top system 312 except it does not include outboard frame members 348 extending to windshield assembly 338. In the example embodiment, the vehicle 400 generally includes a vehicle body 414, an interior with front passenger seating 416 and rear passenger seating 418, and a rear cargo area 420 at least partially enclosed by a tailgate 422 (FIG. 5B) and a rear hatch glass or flipper glass assembly 424. The tailgate 422 is rotatably coupled to the vehicle body 414, and the flipper glass assembly 424 is removably and rotatably coupled to the convertible top system 412. A roll bar assembly 426 extends upwardly from the vehicle body 414 and includes a generally U-shaped main roll bar 428 formed by a pair of laterally spaced apart vertical members 430 interconnected by a transverse member 432. A pair of rear roll or sport bars 434 are coupled to the main roll bar 428 and extend rearward therefrom and downwardly to the vehicle body 414. A pair of laterally spaced apart side bars 436 are coupled to the main roll bar 428 and extend forwardly to a vehicle windshield assembly 438.

Figure 5A:
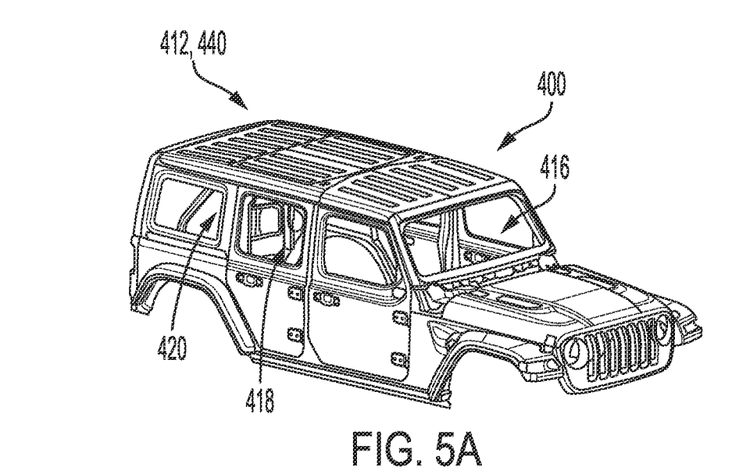
FIG. 5A is a perspective view of a vehicle with yet another example modular multi-component hard top assembly in accordance with the principles of the present disclosure.

With continued reference to FIG. 5A, in the example embodiment, the convertible top system 412 is a multi-component hard top assembly 440 that generally includes a base structure or frame 442 configured to removably receive a plurality of removable roof panels 444a-d, removable quarter windows 446, and the removable flipper glass assembly 424. As shown for example in FIGS. 5C and 5D, the base frame 442 is removably coupleable to the roll bar assembly 426 and includes a rear window frame member 450, a rear cargo area roof 452, a cross-car intermediate support member 454, and partially extending rear outboard frame members 456. In some examples, the rear window frame member 450, the rear roof 452 and/or the intermediate support members 454 are permanently fixed between and integrated with the outboard frame members 456.

Figure 5B:
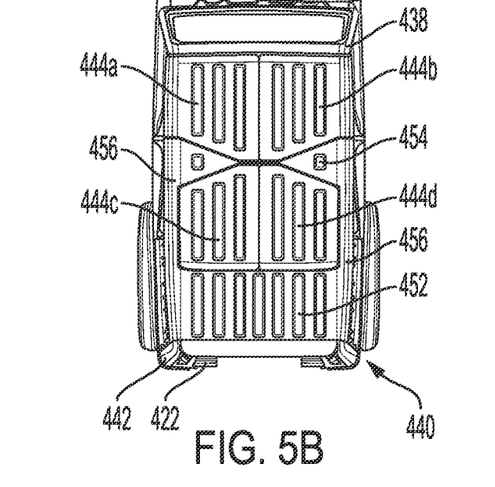
FIG. 5B is a top view of the hard top assembly shown in FIG. 5A in accordance with the principles of the present disclosure.
Figure 5C:
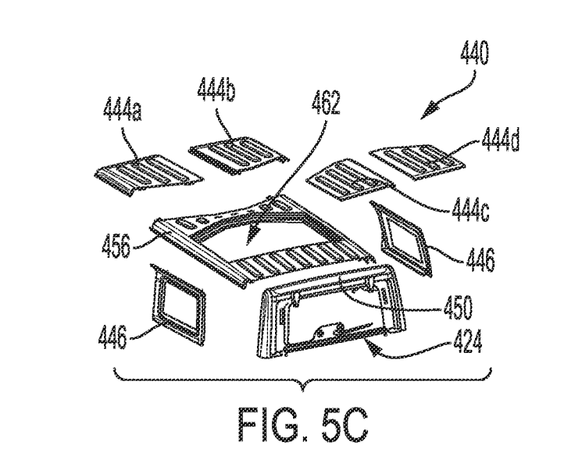
FIG. 5C is an exploded view of the hard top assembly shown in FIG. 5A, in accordance with the principles of the present disclosure.
Figure 5D:
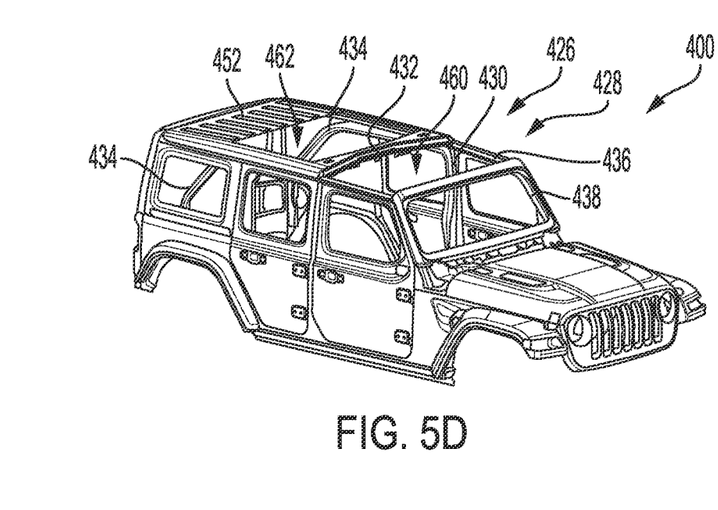
FIG. 5D is perspective view of the vehicle of FIG. 5A with components of the hard top assembly removed, in accordance with the principles of the present disclosure.

As shown in FIG. 5D, the side bars 436, the intermediate support member 454, and the windshield assembly 438 at least partially define a front passenger overhead opening 460. The front removable roof panels 444a-b are each removably coupled to at least one of the side bar 436, intermediate support member 454, and windshield assembly 438 to selectively enclose the front overhead opening 460.

In the example embodiment, the rear roof 452, the intermediate support member 454, and the rear outboard frame members 456 at least partially define a rear passenger overhead opening 462. The rear/intermediate removable roof panels 444c-d are each removably coupled to at least one of the rear cargo area roof 452, the intermediate support member 454, and one rear outboard frame member 456 to selectively enclose the rear passenger overhead opening 462. The removable quarter windows 446 are removably coupled to and between the roof 452/rear outboard frame member 456 and the vehicle body 414, and the removable flipper glass assembly 424 is removably coupled to the rear window frame member 450. When assembled, the hard top assembly 440 provides a sealed contiguous or substantially contiguous vehicle roof over the vehicle interior cabin.

Advantageously, in the example embodiment, driver overhead removable roof panel 444a is selectively uncoupleable from the hard top assembly 440 to provide an open air configuration over the driver's side of front passenger seating 416, and front passenger overhead removable roof panel 444b is selectively uncoupleable from the hard top assembly 440 to provide an open air configuration over the front passenger's side of front passenger seating 416. Similarly, intermediate removable roof panel 444c is selectively uncoupleable from the hard top assembly 440 to provide an open air configuration over the driver's side rear passenger seating 418, and intermediate removable roof panel 444d is selectively uncoupleable from the hard top assembly 440 to provide an open air configuration over the right side of rear passenger seating 318. To provide open air configuration to the rear cargo area 420, the removable quarter windows 446 and the removable flipper glass assembly 424 are selectively uncoupleable from the hard top assembly 440, as shown in FIGS. 5C and 5D.

FIGS. 5A and 5B illustrate the vehicle 400 with the hard top assembly 440 assembled onto the vehicle body 414. If desired, a user can remove one or more portions of the hard top assembly 440 from the vehicle body 414. In this way, the hard top assembly 440 enables the ability to create an open air experience by removing the roof panels 444, quarter windows 446, and flipper glass assembly 424, as shown in FIG. 5D, or by removing the entire hard top assembly 440 altogether (not shown). Unlike a single piece assembly, the hard top assembly 440 includes multiple separately removable panels/windows/components that enable a single person to easily convert the vehicle 400 from an enclosed configuration (hard top assembly attached, FIG. 5A) to an open-air configuration (hard top assembly, or portions thereof, removed) for example, as shown in FIG. 5D.

Described herein are systems and methods for vehicles with modular, multi-component convertible hard top assemblies. In the various examples, the convertible hard top assemblies include a plurality of selectively removable panels/windows/components to facilitate providing an open air vehicle configuration. This also enables a single operator to potentially remove the hard top components or entire assembly alone and advantageously store the hard top assembly components without assistance or specialized equipment.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A modular, multi-component hard top assembly for a vehicle having an interior area with front passenger seating, rear passenger seating, and a rear cargo area, the hard top assembly comprising:
    a hard top base frame that forms part of an exterior roof surface and is configured to removably couple to a body of the vehicle, the base frame including a pair of outboard side frame members having a portion of the exterior roof surface; and
    a plurality of removable roof panels selectively coupleable to the base frame to integrate with the pair of outboard side frame members and complete a substantially contiguous roof over the vehicle interior area,
    wherein each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment to detach, remove, and transport the smaller portion, and
    wherein the base frame further includes a fixed rear roof permanently fixed between and integrated with the outboard side frame members, the fixed rear roof configured to be disposed in a location above and across the rear passenger seating and the rear cargo area when the base frame is coupled to the vehicle body.

2. The modular, multi-component hard top assembly of claim 1, further comprising a pair of removable quarter windows selectively coupleable to the base frame to at least partially enclose the rear cargo area, wherein each removable quarter window is separately removable from the base frame to provide an open air configuration at the rear cargo area while enabling the user to detach, remove, and transport the removable quarter windows of the hard top assembly without assistance or specialized equipment to detach, remove, and transport the removable quarter windows.

3. The modular, multi-component hard top assembly of claim 1, wherein the base frame includes a rear window frame member.

4. The modular, multi-component hard top assembly of claim 3, further comprising a removable flipper glass assembly rotatably coupled to the base frame and movable between a closed position and an open position, wherein the flipper glass assembly is selectively detachable from the rear window frame member to provide an open air configuration at the rear cargo area while enabling the user to detach, remove, and transport the removable flipper glass assembly of the hard top assembly without assistance or specialized equipment to detach, remove, or transport the removable flipper glass assembly.

5. The modular, multi-component hard top assembly of claim 1, wherein the plurality of removable roof panels comprises:
    a driver overhead removable roof panel configured to removably couple to the base frame in a location above only a driver's side of the front passenger seating; and
    a front passenger overhead removable roof panel configured to removably couple to the base frame in a location above only a front passenger side of the front passenger seating.

6. The modular, multi-component hard top assembly of claim 1, wherein the plurality of removable roof panels are configured to be disposed inboard of the spaced apart outboard side frame members when the plurality of removable roof panels are coupled to the base frame.

7. A modular, multi-component hard top assembly for a vehicle having an interior area with front passenger seating, rear passenger seating, and a rear cargo area, the hard top assembly comprising:
    a hard top base frame that forms part of an exterior roof surface and is configured to removably couple to a body of the vehicle, the base frame including a pair of outboard side frame members having a portion of the exterior roof surface; and
    a plurality of removable roof panels selectively coupleable to the base frame to integrate with the pair of outboard side frame members and complete a substantially contiguous roof over the vehicle interior area,
    wherein each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment to detach, remove, and transport the smaller portion, and
    wherein the base frame further comprises an intermediate support member and a fixed rear roof permanently fixed between and integrated with the outboard frame members to thereby, along with the outboard side frame members, define and completely frame a rear passenger overhead opening, the fixed rear roof configured to be disposed in a location above and across the rear cargo area when the base frame is coupled to the vehicle body.

8. The modular, multi-component hard top assembly of claim 7, wherein the plurality of removable roof panels comprises:
    an intermediate left removable roof panel configured to removably couple to the base frame in a location within the rear passenger overhead opening above a left side of the rear passenger seating; and
    an intermediate right removable roof panel configured to removably couple to the base frame in a location within the rear passenger overhead opening above a right side of the rear passenger seating.

9. A vehicle comprising:
a vehicle body;
a roll bar assembly;
a vehicle interior area with front passenger seating, rear passenger seating, and a rear cargo area; and
a modular, multi-component hard top assembly configured to selectively and removably couple to the roll bar assembly to provide an enclosed configuration at least partially enclosing the vehicle interior area, and subsequently detachable from the roll bar assembly to provide an open air configuration for the vehicle interior area, the hard top assembly comprising:
  a hard top base frame that forms part of an exterior roof surface and is configured to removably couple to the vehicle body, the base frame including a pair of outboard side frame members having a portion of the exterior roof surface; and
  a plurality of removable roof panels selectively coupleable to the base frame to integrate with the pair of outboard side frame members to create a substantially contiguous roof over the vehicle interior area,
  wherein each removable roof panel of the plurality of removable roof panels is separately removable from the base frame to provide an open air configuration at that specific location of the hard top assembly while enabling a user to detach, remove, and transport a smaller portion of the hard top assembly without assistance or specialized equipment to detach, remove, and transport the smaller portion, and
  wherein the base frame further includes a fixed rear roof permanently fixed between and integrated with the outboard side frame members, the fixed rear roof configured to be disposed in a location above and across the rear passenger seating and the rear cargo area when the base frame is coupled to the vehicle body.

10. The vehicle of claim 9, wherein the plurality of removable roof panels includes a forward removable roof panel configured to removably couple to the base frame in a location above and across the front passenger seating.

11. The vehicle of claim 10, wherein the forward removable roof panel comprises:
  a driver overhead removable roof panel configured to removably couple to the base frame in a location above a driver's side of the front passenger seating; and
  a front passenger overhead removable roof panel configured to removably couple to the base frame in a location above a front passenger side of the front passenger seating.

12. The vehicle of claim 9, wherein the hard top assembly further comprises a pair of removable quarter windows selectively coupleable to the base frame to at least partially enclose the rear cargo area, wherein each removable quarter window is separately removable from the base frame to provide an open air configuration at the rear cargo area while enabling the user to detach, remove, and transport the removable quarter windows of the hard top assembly without assistance or specialized equipment to detach, remove, and transport the removable quarter windows.

13. The vehicle of claim 12, wherein the base frame includes a rear window frame member.

14. The vehicle of claim 13, wherein the hard top assembly further comprises a removable flipper glass assembly rotatably coupled to the base frame and movable between a closed position and an open position, wherein the flipper glass assembly is selectively detachable from the rear window frame member to provide an open air configuration at the rear cargo area while enabling the user to detach, remove, and transport the removable flipper glass assembly of the hard top assembly without assistance or specialized equipment to detach, remove, and transport the removable flipper glass assembly.

15. The vehicle of claim 9, wherein the outboard side frame members extend from uppermost rear corners of the roof to a windshield assembly of the vehicle.

* * * * *